April 25, 1961 J. L. PUTNAM 2,981,284
BALL VALVE
Filed July 24, 1959 3 Sheets-Sheet 1

INVENTOR
Joseph L. Putnam
BY
Bailey, Stephens & Huettig
ATTORNEYS

April 25, 1961  J. L. PUTNAM  2,981,284
BALL VALVE

Filed July 24, 1959  3 Sheets-Sheet 2

INVENTOR
Joseph L. Putnam
BY Bailey, Stephens & Huebig
ATTORNEYS

April 25, 1961  J. L. PUTNAM  2,981,284
BALL VALVE

Filed July 24, 1959  3 Sheets-Sheet 3

INVENTOR
Joseph L. Putnam

BY Bailey, Stephens & Huettig
ATTORNEYS ions and Patent Office  
2,981,284  
Patented Apr. 25, 1961

2,981,284
BALL VALVE

Joseph L. Putnam, Houlton, Maine, assignor to The J. L. Putnam Company, Inc., Houlton, Maine, a corporation of Maine Filed July 24, 1959, Ser. No. 829,441

10 Claims. (Cl. 137—556.3)

This invention relates to a valve having a spherical ball.

The objects of this invention are to produce a ball valve having a port opening of the same diameter as the pipe to which the valve is connected in order to produce a turbulent free flow of media through the valve; to produce a structure in which the valve seat seals can be changed without undue effort; to produce a valve having valve stem seals which give a tight seal without binding the valve stem against turning; to produce a valve having a basic design usable over a temperature range from about −400° F. to +400° F. and within pressure limits from high vacuum to about 1,000 pounds per square inch; to produce a valve having an improved key between the valve stem and ball for ensuring greater accuracy of indicating the valve opened and closed position; to produce a method of accurately pre-pressurizing the seals for the ball; and adapted to produce an improved sanitary seal around the valve stem and behind the spherical ball.

In general, these objects are obtained by constructing a valve body with a cylindrical passage therethrough. An enlarged recess is formed in this passage into which a spherical ball is mounted against resilient seals. A body insert threaded into one side of the body gives strength to the body and forms a portion of the cylindrical passage and a seat for one of the ball seals. The inward movement of this insert is limited by a shoulder on the body so that the ball seat seals cannot be over-pressurized. The spherical ball has an outer circular recess for receiving the circular portion of the end of the valve stem and an inner bottom recess which is either oblong or diamond shaped for receiving a correspondingly shaped end of the valve stem. This eliminates sharp edges and the chance of scoring the stem sealing packing required in sanitary valve applications. The valve stem rotates in a bonnet formed on the valve body. Inner and outer box ring bearings are located on opposite sides of a shoulder around the stem, and the space between the innermost bearing and the valve body is filled by resilient O-rings spaced by separators to prevent the O-rings from rippling when the valve stem is turned. This prevents metal to metal contact within the valve. The basic valve design is such that it can be used in the piping of such diverse corrodents as acids, alkalides, solvents, slurries, sand blasting fluids, vacuum, air, water and cryogenic materials.

The means by which the objects of the invention are obtained are shown more fully with reference to the accompanying drawings, in which:

Figure 11 is an enlarged detail view of the portion of Figure 1 showing the valve stem seals;

Figure 1:
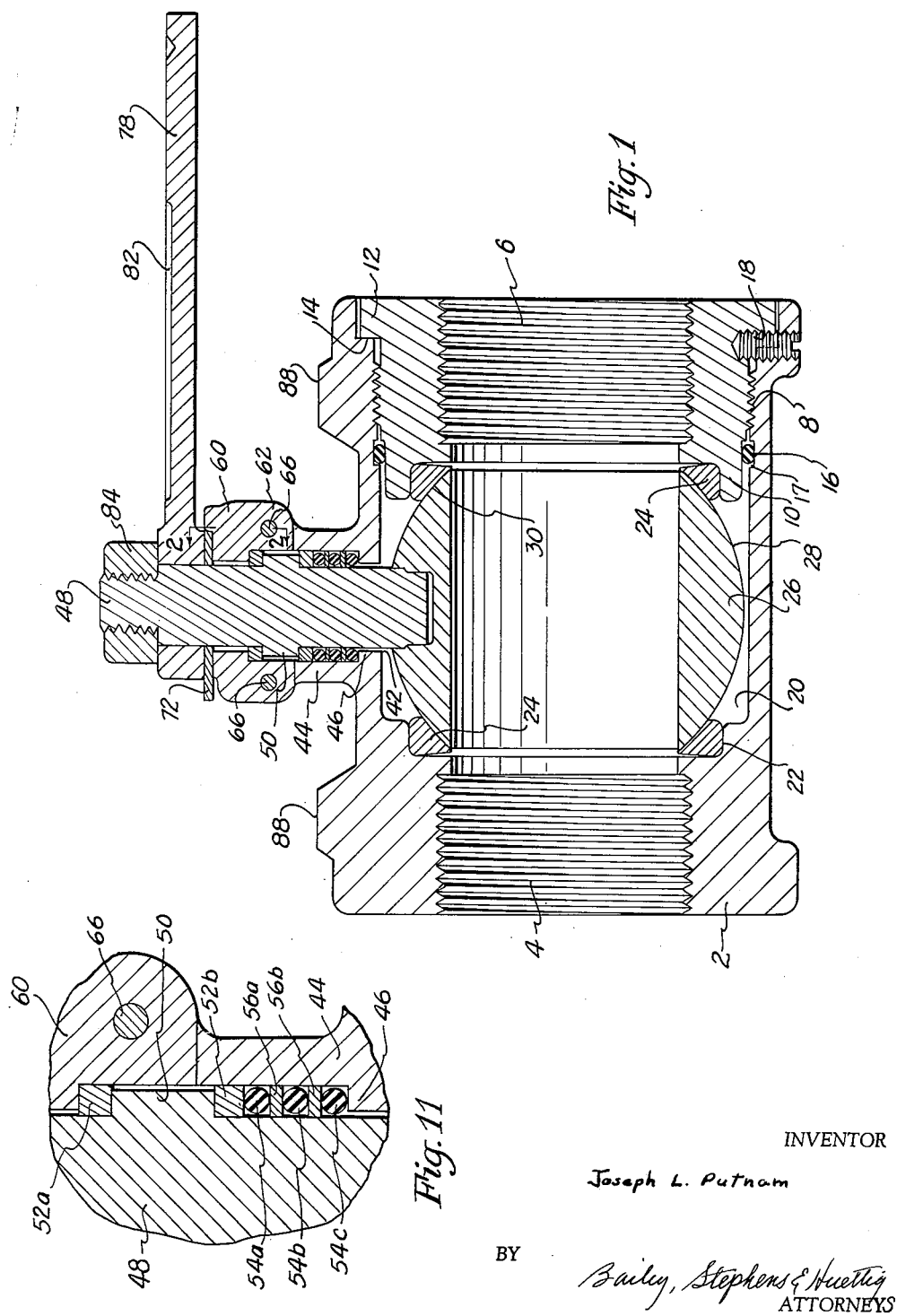
Figure 1 is a longitudinal cross-sectional view through the valve.
Figure 2:
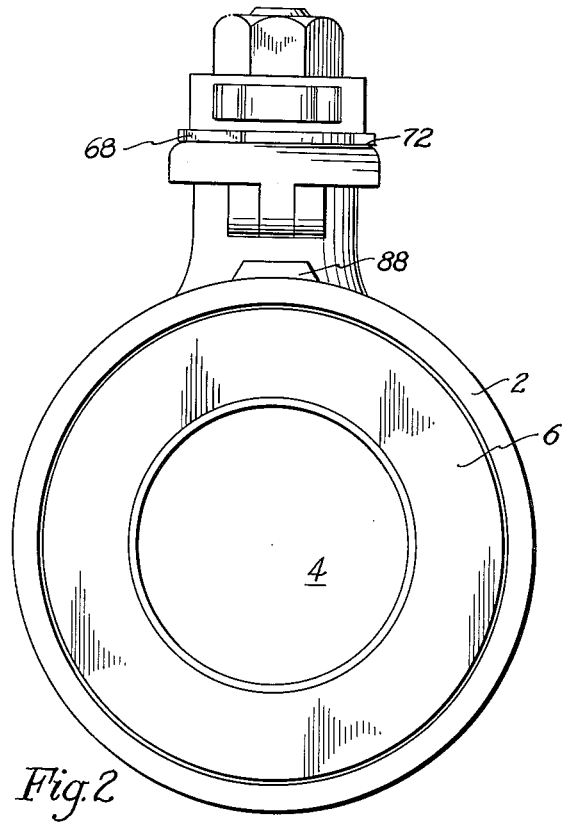
Figure 2 is an end view of Figure 1.

The valve is composed of body 2 having a cylindrical passage 4 longitudinally therethrough. One end of the body has a body insert 6 joined to the body by threads 8. The inner end of insert 6 has a flange 10 forming a circular valve seat. The outer end of insert 6 has a circular flange 12 which bears against a shoulder 14 formed in body 2 and thus limits the inner travel of insert 6. A circular seal 16 set in a recess 17 in body 2 between insert 6 and body 2 makes leakproof the joint between the insert 6 and the body 2. The insert is locked into place by a set screw 18 which extends radially of the axis of the passage 4 through the body and from the outside of a thickened end portion of the body into a part of flange 12 and the insert itself, but is spaced from threads 8. Consequently, neither the sealing nor the strength qualities of the threaded connection between the insert and the body is affected.

Figure 4:
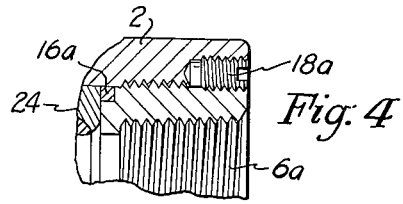
Figure 4 is a partial detail cross-sectional view of a modification of the valve insert fastener shown in Figure 1.
Figure 5:
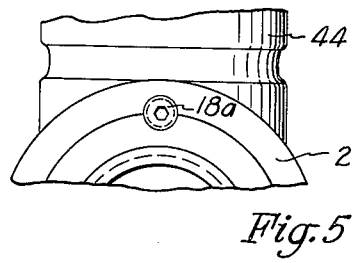
Figure 5 is a side view of Figure 4.

A modified set screw fastening is shown in Figures 4 and 5. Insert 6a is threaded into body 2 and bears against seal 24. A ring seal 16a prevents leakage through the threads. Screw 18a is set in the joint between the insert and the body and terminates short of the threaded joint between the body and the insert.

Through part of the passage 4 in body 2 is an enlarged recess 20. One end of this recess has a circular shoulder 22 forming a seat for a seal. The shoulder 22 and the shoulder formed by flange 10, respectively, are seats holding resilient sealing rings 24 preferably composed of a synthetic material such as nylon, synthetic rubber, or polytetrafluoroethylene such as Teflon.

Figure 6:
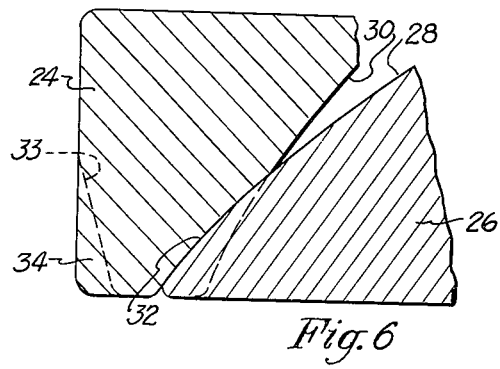
Figure 6 is an enlarged detail cross-sectional view of the portion of Figure 1 showing the engagement of the spherical valve with the valve seat.

Positioned in recess 20 and bearing upon seals 24 is a spherical ball 26. This ball has a cylindrical opening extending therethrough, which opening is of the same diameter as the diameter of cylindrical passage 4 through body 2. The radius of the outer spherical surface 28 of ball 26 is greater than the curvature of the inner surface 30 of each seal 24. The effect of this is as shown in Figure 6. As the surface 28 engages the seal 24, the resilient seal 24 is deflected over the area 32, so that the oblique side 33 is displaced into the area 34. This ensures that there is a dual compressive intersecting tangent rather than a mere surface to surface contact between the ball surface 28 and the seal surface 30. As each of the two ends of ball 26 engages a seal 24, the ball 26 is held under dual compression by the seals, thus making the seal tight against leakage.

Figure 7:
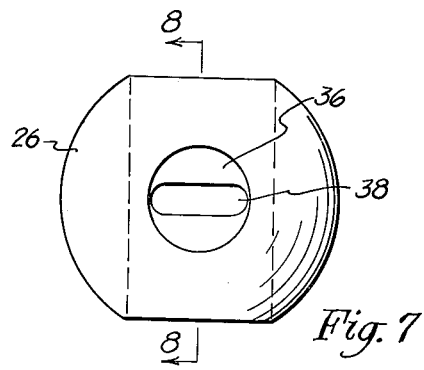
Figure 7 is a top plan view of the spherical ball valve.
Figure 9:
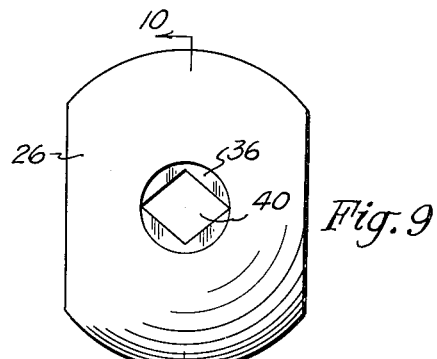
Figure 9 is a top plan view of a modified form of Figure 7.
Figure 8:
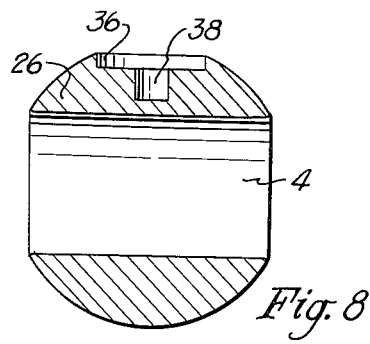
Figure 8 is a cross-sectional view on the line 8—8 of Figure 7.
Figure 10:
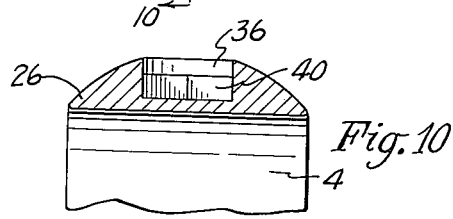
Figure 10 is a cross-sectional view on the line 10—10 of Figure 9.

A recess is formed on one side of ball surface 28 in order to form a keyway for the reception of the lower end of the valve stem. The shape of the keyway is designed to have strength against wear and to indicate valve direction. As seen in Figures 7 and 8, this keyway is composed of an outer circular portion 36 and an inner oblong slot 38. In a modified form as shown in Figures 9 and 10, a diamond shaped recess 40 replaces the oblong slot 38 of Figures 7 and 8. In either case, the keyway is longitudinally aligned with the axis of passage 4 as part of the means for positively identifying the opened and closed positions of the valve.

Referring back to Figure 1, body 2 has a valve stem opening 42 which is concentric with the center of ball 26. Surrounding this opening and spaced therefrom is a bonnet 44 integral with the body and which leaves a circular flange 46 between the bonnet and the opening 42. A valve stem 48 extends through bonnet 44 and has a lower end either of oblong shape to be complementary with the oblong slot 38 in ball 26, Figure 7, or diamond shaped so as to be complementary with the recess 40 of Figure 9. Stem 48 is surrounded by a circular shoulder 50 approximately in the mid-section of the stem, this shoulder being of less diameter than the inner diameter of bonnet 44. The stem 48 is of slightly less diameter than body opening 42.

Above and below shoulder 50, note Figure 11, are box ring bearings 52a and 52b, respectively, which fill the space between stem 48 and the inner surface of bonnet 44. Fitted between the inner bearing 52b and the flange 46 are three O-ring resilient seals 54a, b and c spaced by flat circular separators 56a and 56b. O-rings 54a–c have a diameter slightly larger than the space between stem 48 and the inner surface of bonnet 44. In this construction, the two box ring bearings 52a and b prevent the shaft from making a metal to metal contact with the bonnet 44 upon the rotation of the stem 48. Stem 48 is held with upward pressure by nut 84 to avoid a downward compression of O-rings 54a–c. There is a diametrical squeeze on the O-rings to keep them substantially in tangential contact on the outer surface of stem 48 and the inner surface of bonnet 44 to thwart leakage. The separators 56a and b prevent the O-rings from rippling as the stem 48 is turned. Moreover, this arrangement minimizes the frictional contact between the stem and the seals and therefor less torque is needed to turn stem 48.

The upper edge of bonnet 44 is thickened longitudinally. This produces a recessed portion between the lower edge of the thickened portion and the outer surface of body 2 which is adapted to receive a clamp for holding the valve in some special valve mounting conditions. At the same time, the thickened upper edge provides sufficient metal for fastening a bonnet cap to the bonnet.

Figure 12:
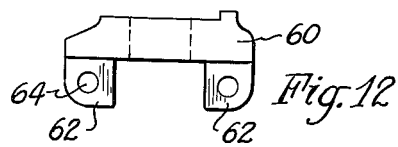
Figure 12 is a side view of the bonnet or adaptor cap.
Figure 13:
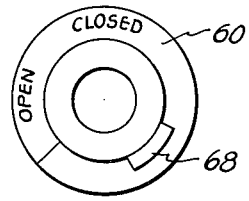
Figure 13 is a plan view of Figure 12.
Figure 14:
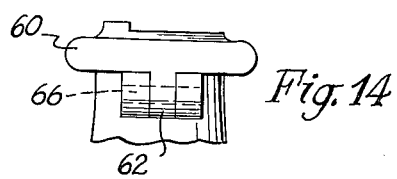
Figure 14 is a side view of the portion of Figure 1 showing the bonnet cap secured to the bonnet of the body of the valve.

The upper edge of bonnet 44 is closed off by a bonnet cap 60. The upper end of this cap is of less inside diameter than the inner diameter of bonnet 44 but of greater diameter than the diameter of stem 48. A ledge is thus formed overlying shoulder 50 for bearing against box ring bearing 52a. At the same time, clearance is left between the stem and cap 60 to permit the turning of the squared head of stem 48. In Figures 1, 12 and 14, the cap 60 has a pair of diametrically aligned ears 62 having apertures 64 therein. These ears fit into complementary slots formed in the upper edge of bonnet 44 and are fastened to the bonnet by pins 66. The outer surface of cap 60 is provided with a stop lug 68 and marked with letters to indicate the opened and closed positions of the ball 26.

Figure 15:
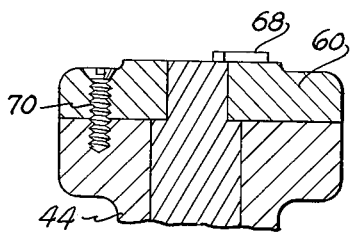
Figure 15 is a cross-sectional view of a modification of the fastening of the bonnet cap to the neck of the body.

In a modified cap fastening device, as shown in Figure 15, the cap 60 is secured to bonnet 44 by means of screws 70 which extend downwardly from the upper surface of cap 60 into bonnet 44.

A stop washer 72 is fitted on stem 48 above cap 60. This washer has a pointer 74 and a pair of wings 76, either of which is adapted to bear against stop 68, depending upon the opened or closed position of the valve. This ensures that the ball 26 is indicated either in its fully opened or fully closed position regardless of the position of the valve handle.

Figure 3:
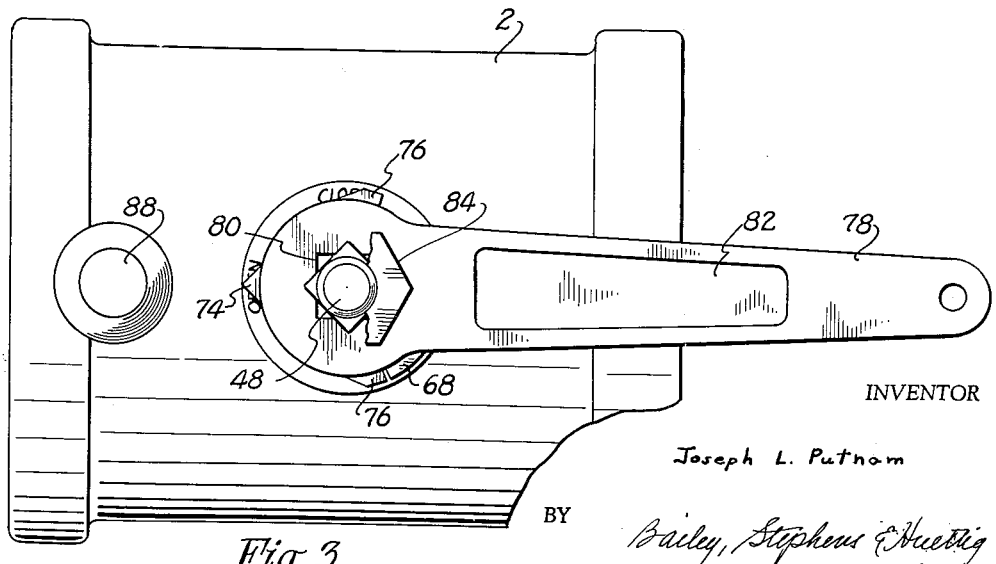
Figure 3 is a top plan view of Figure 1.

A handle 78, note Figures 1 and 3, fits on stem 48.

The handle has an eight-pointed opening 80 formed by two square openings displaced 45° with respect to each other. As the upper end of the stem 48 is square, the eight-pointed opening permits the handle to be set on the stem at any one of a number of angles. The position of the handle can be changed without disturbing the indicator washer 72. This is of considerable advantage for the working of the valve. Furthermore, the handle has a recessed portion 82 adapted to hold a name plate, the recess protecting the name plate from being worn or knocked off the handle. Finally, the handle is secured to stem 48 by means of a nut 84. As this nut, through stop washer 72, bears on bonnet cap 60, it produces an upward thrust on stem 48 which causes an upward pressure on the stem seals and avoids a compression on ball 26. This makes a tight and easily turnable valve.

The top of passage 4 is provided with a pair of integral bosses 88 on opposite sides of bonnet 44. These bosses are for the purpose of being tapped and threaded in order that the valve can be mounted on one side of a panel.

The valve is assembled by first inserting one ring seal 24, then ball 26 followed by stem 48, and then the insert 6 with its seals 16 and 24. The insert is locked in place by either the set screw 18 or screw 18a. Stem 48 with bearing 52b and rings 54a, b and c, with separators 56a and b, is inserted through bonnet 44. Seal 52a is inserted over stem 48, and bonnet cap 60 fastened in place. Indicator washer 72 is placed on stem 48 with its arrow 74 aligned with the axis of the longitudinal opening through ball 26. Handle 78 is then fastened to stem 48 by nut 84. In disassembling for maintenance and repair, the stem 48 can be removed without unfastening handle 78.

The valve of this invention has an improved sealing system over prior art valves such as disclosed in the patent to Sanctuary, No. 2,858,098, together with a greater strength and ease of operation.

Having now described the means by which the objects of the invention are obtained, I claim:

1. A ball valve comprising a valve body having a cylindrical passage extending longitudinally through the body, an enlarged recess in said body midway of said passage, circular seal seats formed on opposite sides of said recess coaxial with said passage, resilient seals in said seats, a spherical ball in said recess engaging said resilient seals and having an opening therethrough of the same diameter as said passage, an opening in said body concentric with said ball, a circular bonnet surrounding and of greater diameter than said opening and integral with said body, a valve stem in said bonnet and projecting through said opening into engagement with said ball, a flange shoulder on said stem within said bonnet, inner and outer box ring bearings on said stem on opposite sides of said shoulder, at least three O-ring stem seals spaced by flat circular separators surrounding said stem and filling the space between said body and the inner box ring bearing, a bonnet cap secured to said bonnet and pressing upon said outer box ring bearing, and a nut on said stem and applying pressure against said bonnet cap for exerting an outward pressure on said stem seals.

2. A ball valve as in claim 1, said stem having an oblong shaped inner end seated in a complementary recess in said spherical ball.

3. A ball valve as in claim 1, said stem having a diamond-shaped inner end seated in a complementary recess in said ball.

4. A ball valve as in claim 1, each resilient seal having a curved surface engaged by said ball with the radius of curvature of said curved surface being different from the radius of said spherical ball.

5. A ball valve as in claim 1, a cylindrical body insert threaded into one end of said body and forming a part of said longitudinally extending cylindrical passage, a circular seal seat on the outer circumference of the inner end of said insert cap, a circular flange on the outer end of said insert engaging a shoulder in said body, and a set screw extending through said body and circular flange and spaced from the threads between said body and insert.

6. A ball valve as in claim 5, said set screw extending radially of said cylindrical passage.

7. A ball valve as in claim 1, a pair of slots in the outer edge of said bonnet, a pair of apertured ears on said bonnet cap extending into said slots, and holding pins extending through said apertured ears for fastening said bonnet cap to said bonnet.

8. A ball valve as in claim 1, further comprising screws extending through said bonnet cap into said bonnet for fastening said bonnet cap to said bonnet.

9. A ball valve as in claim 1, further comprising a stop washer fitted on said stem and resting on said bonnet cap, said washer having a pointer for indicating the direction of the opening in said ball, and stop wings on said washer.

10. A ball valve as in claim 9, further comprising a handle secured to said stem, and a recessed portion in said handle adapted to hold a name plate.

References Cited in the file of this patent

UNITED STATES PATENTS

| 1,221,052 | Henry | Apr. 3, 1917 |
| 2,858,098 | Sanctuary | Oct. 28, 1958 |

FOREIGN PATENTS

| 16,372 | Great Britain | July 20, 1906 |
| 296,102 | Switzerland | Apr. 1, 1954 |